US005961314A

United States Patent [19]

Myhre et al.

[11] Patent Number: 5,961,314

[45] Date of Patent: Oct. 5, 1999

[54] APPARATUS FOR DETECTING FLAME CONDITIONS IN COMBUSTION SYSTEMS

[75] Inventors: Douglas C. Myhre, Eden Prairie; Joachim H. Scholz, Ham Lake; Mark G. Severtson, Eden Prairie; Steven M. Lenertz, Burnsville; Christopher J. Simones; Thomas F. Lenagh, both of Farmington, all of Minn.

[73] Assignee: Rosemount Aerospace Inc., Burnsville, Minn.

[21] Appl. No.: 08/851,665

[22] Filed: May 6, 1997

[51] Int. Cl.[6] .................................. F23N 5/08; G01J 1/32

[52] U.S. Cl. .............................. 431/79; 431/75; 431/346; 431/15; 250/206; 250/214 A; 250/339.02; 250/339.15; 340/578

[58] Field of Search .................................. 431/79, 75, 77, 431/78, 12, 15, 18, 346; 340/577, 578; 250/206, 339.15, 339.02, 554, 214 A, 339.14

[56] References Cited

U.S. PATENT DOCUMENTS

| | | | |
|---|---|---|---|
| 2,840,146 | 6/1958 | Ray | 158/28 |
| 2,844,730 | 7/1958 | Tandler et al. | 250/43.5 |
| 3,185,845 | 5/1965 | Lively et al. | 250/83.6 |
| 3,301,307 | 1/1967 | Nishigaki et al. | 431/78 |
| 3,416,041 | 12/1968 | Giuffrida et al. | 317/148.5 |
| 3,504,490 | 4/1970 | Klamm | 60/39.09 |
| 3,506,830 | 4/1970 | Love, III et al. | 250/83.3 |
| 3,583,844 | 6/1971 | Smith | 431/79 |

(List continued on next page.)

FOREIGN PATENT DOCUMENTS

| | | | |
|---|---|---|---|
| 0 638 770 A1 | 2/1995 | European Pat. Off. . | |
| 0 816 760 A1 | 1/1998 | European Pat. Off. . | |
| 56-92326 | 7/1981 | Japan . | |
| 58-33025 | 2/1983 | Japan | 431/79 |
| 61-197726 | 2/1985 | Japan . | |
| 59-109715 | 6/1994 | Japan | 431/79 |
| 1455-150 A | 1/1989 | U.S.S.R. | 431/79 |
| 2 178 841 | 2/1987 | United Kingdom . | |

OTHER PUBLICATIONS

"Development of a Light–Off and Flame Detector For Gas Turbine Engine," by R. Roby, Jun. 1, 1989–Jun. 1, 1990, pp. 2–21.

"Development of a Light–Off and Flame Quality Detector for Stationary Gas Turbine Engine," by R. Roby, Jul 1, 1990–Dec. 31, 1990, pp. 2–5.

"Development of a Flame Quality Detector for Stationary Gas Turbine Engines—Phase II," by R. Roby May 16, 1991–May 15, 1992, pp. 2–9.

"The Use of Chemiluminescence for Detection of Ignition, Temperature, and Fuel–To–Air Ratio of Flames," by E. Johnsson, Feb. 1991, pp. 1–124.

"Chemiluminescence in the High–Temperature Oxidation of Methane," by C. Bowman et al., Dec. 1968, pp. 611–614

"The Source of the Continuum in Carbon Monoxide–Hydrogen–Air Flames," by W.E. Kaskan, Jun. 1958 pp. 39–48.

"Industrial Applications of Fiber Optic Sensors," by J.W. Berthold III, *Fiber Optic Sensors,* 1991, pp. 409–437.

"Fibre–Optic Spectral Flame Analysis for the Control of Combustion Processes," by P.K. Chau et al., *International Journal of Optoelectronis,* 1988, vol. 3, No. 5, pp. 423–431.

"Rosemount Optical Light–Off Detector for Stationary Turbine Engines," by Rosemount, Feb. 1992.

"Spektrometrisches Messverfahren zur Unterschung der Verbrennung im Dieselmotor," by G. Heinrich et al., 1978, pp. 385–390.

*Primary Examiner*—Ira S. Lazarus
*Assistant Examiner*—Josiah Cocks
*Attorney, Agent, or Firm*—Westman, Champlin & Kelly, P.A.

[57] ABSTRACT

A detector for use in a combustion system includes a probe having a tip adapted for placement through a singular aperture in the mixing area of a combustion system. First and second channels are derived from the probe output and are used to detect a flashback or flameout condition.

13 Claims, 3 Drawing Sheets

U.S. PATENT DOCUMENTS

| | | | |
|---|---|---|---|
| 3,611,805 | 10/1971 | Hishikari | 73/355 |
| 3,689,773 | 9/1972 | Wheeler | 431/79 |
| 3,825,913 | 7/1974 | Metcalf et al. | 431/79 |
| 3,859,520 | 1/1975 | Hertzberg et al. | 250/209 |
| 3,886,351 | 5/1975 | Williams | 250/206 |
| 3,965,360 | 6/1976 | Sakasegawa et al. | 250/461 |
| 3,970,430 | 7/1976 | Reader, Jr. et al. | 23/232 |
| 3,995,221 | 11/1976 | MacDonald | 328/6 |
| 4,016,424 | 4/1977 | Traina | 250/372 |
| 4,029,966 | 6/1977 | Baker et al. | 250/372 |
| 4,045,679 | 8/1977 | Wolfe et al. | 250/461 |
| 4,051,375 | 9/1977 | Schuetz et al. | 250/372 |
| 4,065,672 | 12/1977 | Harpster | 250/372 |
| 4,220,857 | 9/1980 | Bright | 250/339 |
| 4,233,596 | 11/1980 | Okamoto et al. | 340/578 |
| 4,280,058 | 7/1981 | Tar | 250/554 |
| 4,326,798 | 4/1982 | Kahn | 356/45 |
| 4,369,748 | 1/1983 | Steinke et al. | 123/425 |
| 4,370,557 | 1/1983 | Axmark et al. | 250/554 |
| 4,397,283 | 8/1983 | Kamaroff et al. | 123/494 |
| 4,419,212 | 12/1983 | Dietz et al. | 204/424 |
| 4,455,487 | 6/1984 | Wendt | 250/339 |
| 4,541,272 | 9/1985 | Bause | 73/118 |
| 4,553,031 | 11/1985 | Cholin et al. | 250/339 |
| 4,561,786 | 12/1985 | Anderson | 374/129 |
| 4,578,583 | 3/1986 | Ciammaichella et al. | 250/339 |
| 4,594,968 | 6/1986 | Degobert et al. | 123/1 |
| 4,599,568 | 7/1986 | Couch | 328/6 |
| 4,616,137 | 10/1986 | Goff et al. | 250/554 |
| 4,632,563 | 12/1986 | Lord, III | 356/437 |
| 4,691,196 | 9/1987 | Kern et al. | 340/578 |
| 4,694,172 | 9/1987 | Powell et al. | 250/339 |
| 4,701,624 | 10/1987 | Kern et al. | 340/578 |
| 4,706,629 | 11/1987 | Wineland et al. | 123/478 |
| 4,706,630 | 11/1987 | Wineland et al. | 123/478 |
| 4,709,155 | 11/1987 | Yamaguchi et al. | 250/554 |
| 4,730,925 | 3/1988 | Chiba et al. | 356/311 |
| 4,742,236 | 5/1988 | Kawakami et al. | 250/554 |
| 4,770,129 | 9/1988 | Miyata et al. | 123/1 |
| 4,785,292 | 11/1988 | Kern et al. | 340/578 |
| 4,795,256 | 1/1989 | Krause et al. | 356/320 |
| 4,799,787 | 1/1989 | Mason | 356/43 |
| 4,815,841 | 3/1989 | Bickler et al. | 356/43 |
| 4,818,705 | 4/1989 | Schneider et al. | 436/164 |
| 4,822,564 | 4/1989 | Howard | 422/52 |
| 4,887,574 | 12/1989 | Kuroiwa et al. | 123/425 |
| 4,919,099 | 4/1990 | Extance et al. | 123/425 |
| 4,930,478 | 6/1990 | Plee et al. | 123/425 |
| 4,940,033 | 7/1990 | Plee et al. | 123/425 |
| 4,974,552 | 12/1990 | Sickafus | 123/1 |
| 4,996,427 | 2/1991 | Noble et al. | 250/332 |
| 5,024,055 | 6/1991 | Sato et al. | 60/39.27 |
| 5,031,234 | 7/1991 | Primas et al. | 455/605 |
| 5,039,189 | 8/1991 | Lytel et al. | 385/2 |
| 5,040,242 | 8/1991 | Tsuchiya et al. | 359/154 |
| 5,049,063 | 9/1991 | Kishida et al. | 431/79 |
| 5,060,302 | 10/1991 | Grimes | 359/135 |
| 5,067,463 | 11/1991 | Remboski et al. | 123/425 |
| 5,111,333 | 5/1992 | Coles et al. | 359/333 |
| 5,111,519 | 5/1992 | Mathis | 385/24 |
| 5,113,828 | 5/1992 | Remboski et al. | 123/425 |
| 5,125,381 | 6/1992 | Nutton et al. | 123/425 |
| 5,136,666 | 8/1992 | Anderson et al. | 385/24 |
| 5,148,667 | 9/1992 | Morey | 60/39.02 |
| 5,155,545 | 10/1992 | Rinke | 356/300 |
| 5,162,658 | 11/1992 | Turner et al. | 340/578 |
| 5,186,146 | 2/1993 | Sohma et al. | 123/435 |
| 5,210,702 | 5/1993 | Bishop et al. | 364/496 |
| 5,225,810 | 7/1993 | Inoue et al. | 340/577 |
| 5,236,328 | 8/1993 | Tate et al. | 431/79 |
| 5,241,367 | 8/1993 | Grob et al. | 356/435 |
| 5,257,496 | 11/1993 | Brown et al. | 60/39.06 |
| 5,263,851 | 11/1993 | Hosome et al. | 431/79 |
| 5,303,684 | 4/1994 | Brown et al. | 123/435 |
| 5,317,165 | 5/1994 | Montagna | 340/578 |
| 5,495,112 | 2/1996 | Maloney et al. | 431/79 |
| 5,548,277 | 8/1996 | Wild | 431/78 |
| 5,565,672 | 10/1996 | Siegel et al. | 250/214 A |
| 5,612,676 | 3/1997 | Plimpton et al. | 340/578 |
| 5,646,573 | 7/1997 | Bayruns et al. | 250/214 A |
| 5,748,090 | 5/1998 | Borg et al. | 340/578 |

APPARATUS FOR DETECTING FLAME CONDITIONS IN COMBUSTION SYSTEMS

BACKGROUND OF THE INVENTION

The present invention relates to combustion systems. More specifically, the invention relates to an apparatus for detecting and monitoring the flame in a combustion system.

There is an increasing need for improved apparatus for accurately detecting the flame, and for performing diagnostic monitoring of the flame in combustors such as are found in land and aircraft gas turbine engines, industrial boilers, and other such machines. The combustion systems in these types of machines can be annular, tubular, can-annular, and other designs known to those skilled in the art. Accurate combustor flame detection and monitoring is necessary to prevent failure of the combustor during operation. In complex combustion systems, such as those used in gas turbine engines, flame instability can produce either a flashback or a flameout condition, either of which can lead to a catastrophic failure of the entire engine. Combustor failure can be prevented by ensuring that the combustor flame (or flames) is lighted during operation of the engine, by ensuring that the flame remains lighted continuously throughout the operation of the engine, and by ensuring that the flame remains stable, to prevent flashback, flameout, or any other combustion anomaly.

New demands presently being imposed on combustion systems, to meet increasingly stringent air pollution standards, require tighter control of the parameters at which combustors operate. While emission levels, especially of nitrogen oxides ($NO_x$), carbon monoxide (CO), and unburned hydrocarbons (UHC) continue to be limited, the same or better power and performance is expected from combustor systems. These requirements have resulted in a development of low emission combustors which operate near the lean burn limit for reduced production of hazardous emissions. Many methods are used in combustion systems to reduce emissions, including variable geometry combustion system designs, lean pre-mixed designs, and staged combustion designs, among others. Operating combustors of these designs can sometimes lead to combustion instability, which may produce flashback or flameout conditions. Flashback occurs in premixed systems when the flame front propagates rapidly upstream from the steady state combustion zone. The upstream propagation of the flame can lead to significant damage if the flame reaches the area of the fuel injectors, and fuel flow cannot be disconnected or discontinued fast enough. Flameout conditions can occur under many different circumstances. Combustion instability, decreased equivalence ratio, and poor mixing (among other conditions) can lead to the downstream movement of the flame, out of the steady state combustion zone. This can lead to the flame actually being extinguished. In order to monitor the stability and condition of the flame, real-time combustion diagnostic systems which are capable of determining flameout and flashback conditions have been developed.

The most commonly used flame detector sensor for gas turbine combustors is the Geiger-Müller phototube. The phototube consists of a sealed glass envelope that contains a gas at a low pressure that is easily ionized. Two electrodes extend into the envelope and are separated by a short distance. During operation of the turbine engine, a high voltage potential is applied across the electrodes. When ultraviolet photons in the 180 to 260 nanometer range are emitted from the combustor flame and impinge on the tube, the gas within the envelope is ionized. The ionization process allows a current to flow between the electrodes producing a pulsed output. Signal conditioning circuitry, used in conjunction with the phototube, determines the pulse frequency of the output which is sent to a control system. A threshold frequency is set in the system indicating the presence of flame. When the frequency drops below the threshold, the system receives a signal corresponding to a loss of flame.

While Geiger-Müller tubes have been useful in monitoring flameout conditions, they have not been useful for detecting flashback because of their large size due to high voltage insulation, lack of viewing area discrimination and the difficulty of installing the tubes and their associated electronics into a complex burner design.

Geiger-Müller tubes can typically respond to a flame on/flame out condition in about 100 to 200 milliseconds (ms). For modern gas turbine engines and related applications operating with gaseous fuel, 100 to 200 ms is considered too slow to effectively signal the appropriate control values to stop the flow of fuel to the combustor, and thereby too slow to prevent damage to the engine. Geiger-Müller phototubes also typically operate at very high voltage levels (above 300 volts) which require special power supplies and can be dangerous to personnel working around the combustion system being monitored.

The most commonly used flashback sensor for gas turbine combustors are thermocouple based sensor systems. For flashback conditions, the thermocouple sensors respond too slowly; thermocouple sensors have historically been used for monitoring the occurrence of flashback in premixed combustion systems. Numerous thermocouple sensors are attached to the internal wall of the combustor in the mixing region, upstream of the combustion chamber. A control system monitors the thermocouples and specifically looks for sharp temperature rises that are indicative of a flashback condition. However, thermocouples are relatively slow to react and can be damaged easily under exposure to excessive temperatures. Because thermocouples are capable of measuring only local temperatures, a significant number of thermocouples are required to provide an effective flashback detection system in all areas of the combustion system. Further, if one or more thermocouples becomes damaged during operation of the engine, it is difficult, time consuming, and costly to repair the overall thermocouple sensing system.

Accordingly, the combustor system industry has a need for an apparatus for detecting both flameout and flashback conditions that is easy to install, provides a fast time response, and minimizes the number of installation points in the combustion system.

SUMMARY OF THE INVENTION

One aspect of the present invention includes an apparatus for detecting a flameout condition and/or a flashback condition using a single intrusion into the combustion system. In one embodiment, an optical sensor is placed in the region of the combustion system where fuel and air is mixed. During operation, the sensor monitors the condition of the flame, and is capable of detecting the flame. Furthermore, at the onset of a flashback or flameout condition, the sensor is adapted to provide a signal indicative of that condition.

Another aspect of the invention includes an apparatus for deriving two separate output channels from a single penetration into the engine cavity. For example, one channel may be adapted for detection of flashback, while the other channel may be adapted for detection of flame presence (or, conversely, flameout). In one embodiment, the invention includes an optical detector spaced apart from and optically coupled to the combustion system, through a fiber optic cable which, in turn, is attached to a probe mounted on the wall of the combustion system. The radiation intensity measurement of flame presence and flashback is derived using one or more photodetectors optically coupled to a singular port viewing into the combustion system. In one embodiment, during operation a flashback signal is generated if the sensor output exceeds a predetermined limit. Similarly, a flameout condition is provided if the sensor output is below a predetermined limit.

DETAILED DESCRIPTION OF THE PREFERRED EMBODIMENTS

Figure 1:
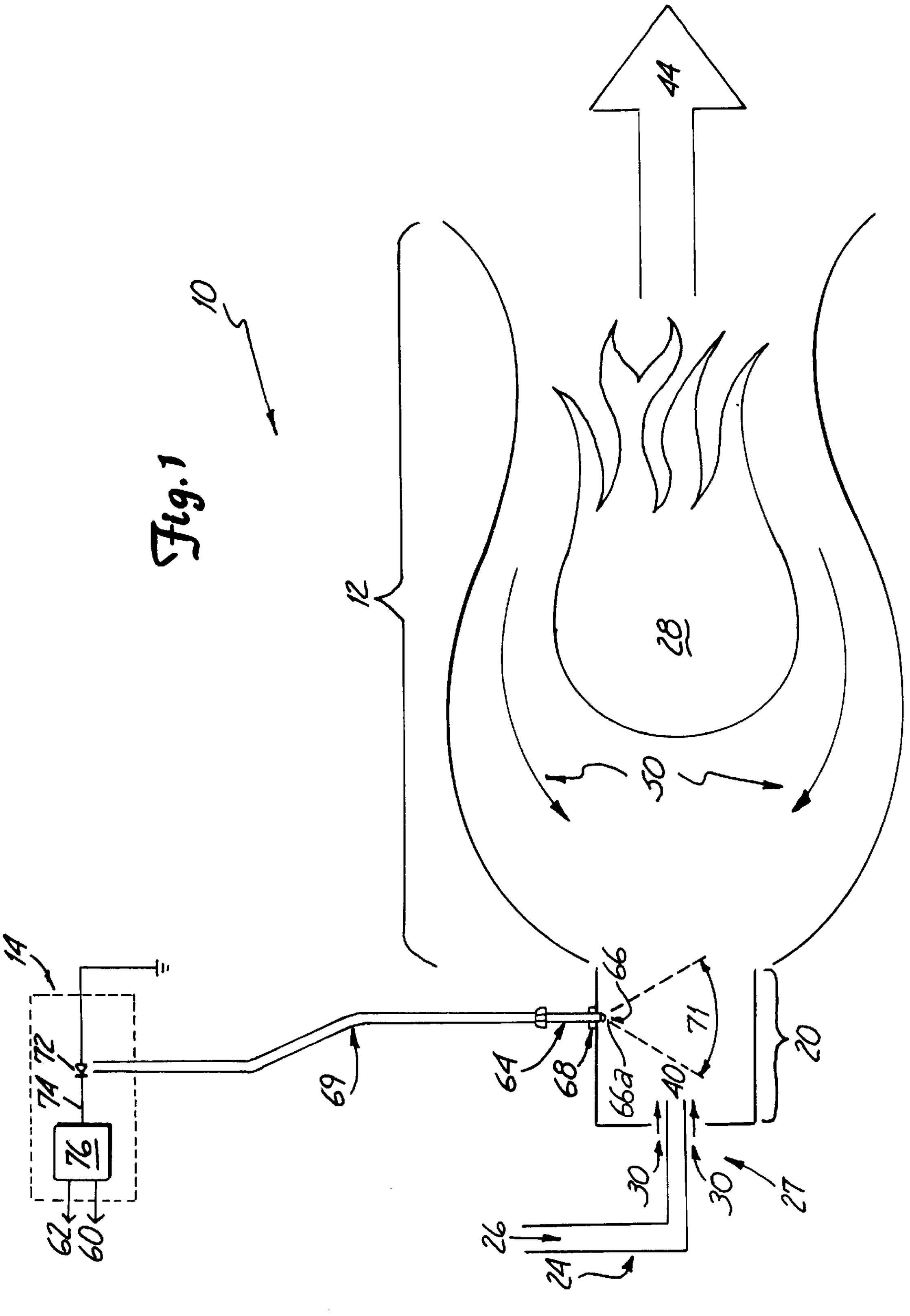
FIG. 1 is a simplified drawing showing a combustion system utilizing an optical flame detection system of the present invention.

FIG. 1 is a simplified diagram of a combustion system 10 in accordance with the present invention. Combustion system 10 includes combustion chamber 12, mixing area 20 and a fuel/air delivery system 27. A fuel line 24 delivers fuel 26 into the mixing area 20 and an air line 30 delivers air into the mixing area 20. Fuel line 24 couples to fuel nozzle 40 which is oriented to spray fuel 26 to mix with air in the mixing area 20. The sprayed fuel and air mixture is ignited using conventional techniques resulting in a flame 28 in the combustion chamber 12. The resulting combustion produces a hot, high pressure exhaust gas stream 44 which, in the case of a gas turbine engine, moves downstream to a high pressure turbine stage (not shown).

As indicated above, combustion systems such as the system 10 shown in FIG. 1 may experience a number of types of failures during operation. For example, it is possible for the flame 28 to blow out, resulting in what is considered a flameout condition. During a flameout, unburned fuel flows into the combustion chamber 12 which can create an uncontrolled combustion state or even result in a dangerous explosion if the fuel is subsequently ignited downstream. Alternatively, during a flashback condition, it is possible for the flame 28 to move upstream in the direction indicated by arrow 50 from the combustion chamber 12 into the mixing area 20. Combustion in the mixing area 20 can damage the fuel nozzles 40 or other components not shown in FIG. 1.

Detector system 14 of the present invention provides output signals 60 and 62, indicative of flameout and flashback conditions, respectively. Detector 14 includes a probe 64 having a tip 66 which is positioned in the mixing area 20 through a singular opening 68 in the wall of the mixing area 20. In one preferred embodiment, the probe 64 includes a tip 66 inserted directly into the mixing chamber 20. Tip 66 is optically coupled to light guide 69 which, in turn, is optically coupled to a photodetector 72. Useful light guides include, but are not limited to, fiber optic cables and rigid glass rods. Radiation in the field of view 71 of the probe tip 66 is received from the flame 28 through an optional lens 66*a* and is transmitted via the light guide 69 to photodetector 72 of the optical detection system 14. Operation of the detector circuitry 76 is described below in greater detail. Signals 60 and 62 are provided to appropriate control circuitry (not shown) for controlling the combustion system 10, whereby system 10 may be rapidly shut down or other appropriate corrective measures taken in the event of either a flameout or flashback condition.

Figure 2:
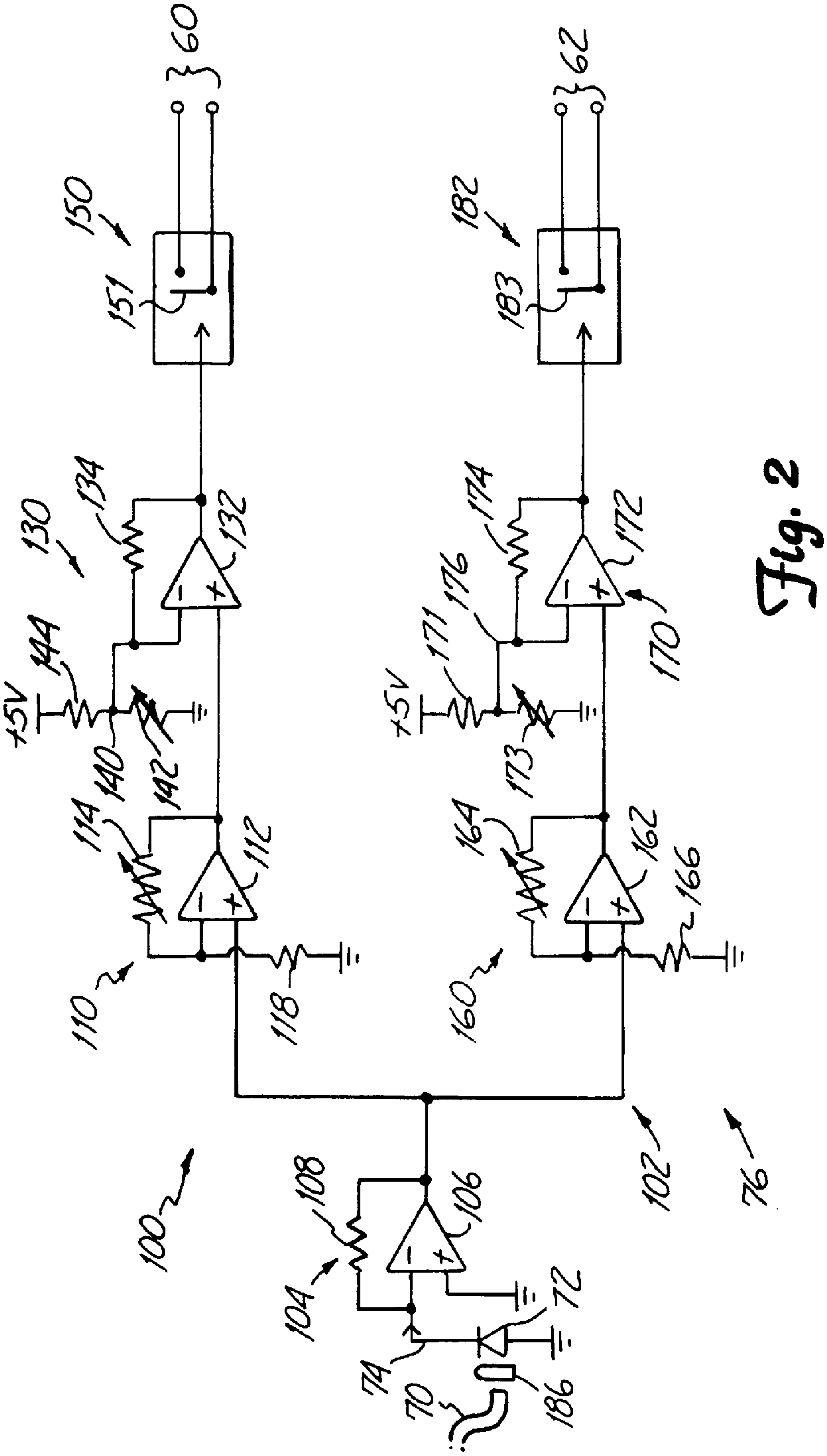
FIG. 2 is a simplified electronic schematic diagram of the optical detection system circuitry in accordance with one embodiment of the invention.

Referring now to FIG. 2, a simplified schematic diagram of detector circuitry 76 in accordance with one preferred embodiment of the invention is shown. Detector circuitry 76 includes flameout detector channel 100 and flashback detector channel 102, both coupled to amplifier 104. Amplifier 104 comprises a transimpedance amplifier 106 with negative feedback through resistor 108 and having a negative input connected to output 74 of photodiode 72. Channel 100 includes an adjustable gain amplifier 110 which comprises an operational amplifier 112 having negative feedback through potentiometer 114 which couples to ground through resistor 118. The output from amplifier 110 couples to comparator circuit 130 which is formed by operational amplifier 132 having negative feedback through resistor 134. A potentiometer 142 which is part of a voltage divider with resistor 144 allows adjustment of the reference level 140 to the comparator circuit 130. The output of the comparator circuit 130 is used to drive a solid state relay 150 (modeled as switch 151) to generate the flameout signal 60.

Similarly, flashback detector channel 102 includes an adjustable gain amplifier formed by operational amplifier 162 and having negative feedback through potentiometer 164 which couples to ground through resistor 166. The output from amplifier 160 couples to comparator circuit 170 which is formed by operational amplifier 172 having negative feedback through resistor 174. A potentiometer 173 which is part of a voltage divider with resistor 171 allows adjustment of the referenced level 176 to the comparator circuit 170. The output of the comparator circuit 170 is used to drive a solid state relay 182 (modeled as switch 183) to generate a flashback signal 62.

In general, calibration of the flame detection system 14 includes the step of setting the gain of amplifier 110 and 160. The gain of circuits 110 and 160 must be set based upon the specific operating conditions of the combustor, taking into account the actual placement location of the probe tip 66 and the level of radiation emitted by the flame 28. The outputs from amplifier circuits 110 and 160 are provided to comparator circuits 130 and 170, respectively. The comparators 130, 170 provide outputs if their inputs exceed predetermined levels set by voltages 140 and 176. A threshold level for comparator circuit 130 is selected so that during normal operation, the output is "high" and drives signal interface circuitry 150 to the close relay 151 condition. However if flame 28 is extinguished, the output from comparator 130 will go "low" which drives relay 151 to the open position. During normal operation, the output from the comparator 170 is "low" which drives relay 183 to the signal interface circuitry open position. However, upon the occurrence of a flashback, the output of the comparator 170 goes "high" thereby driving the relay 183 to the closed condition.

In one preferred embodiment, photodetector 72 comprises a UV enhanced silicon photodiode, or alternatively, a silicon carbide photodiode. For example, an OPT 301 optoelectronic device is available from Burr-Brown of Tucson Ariz. In one embodiment, amplifier 104 has a gain of about 200 MΩ to about 400 MΩ, amplifier 110 has a gain of about 250 KΩ to about 1 MΩ, and amplifier 160 has a gain of about 10 KΩ to about 100 KΩ.

Figure 3:
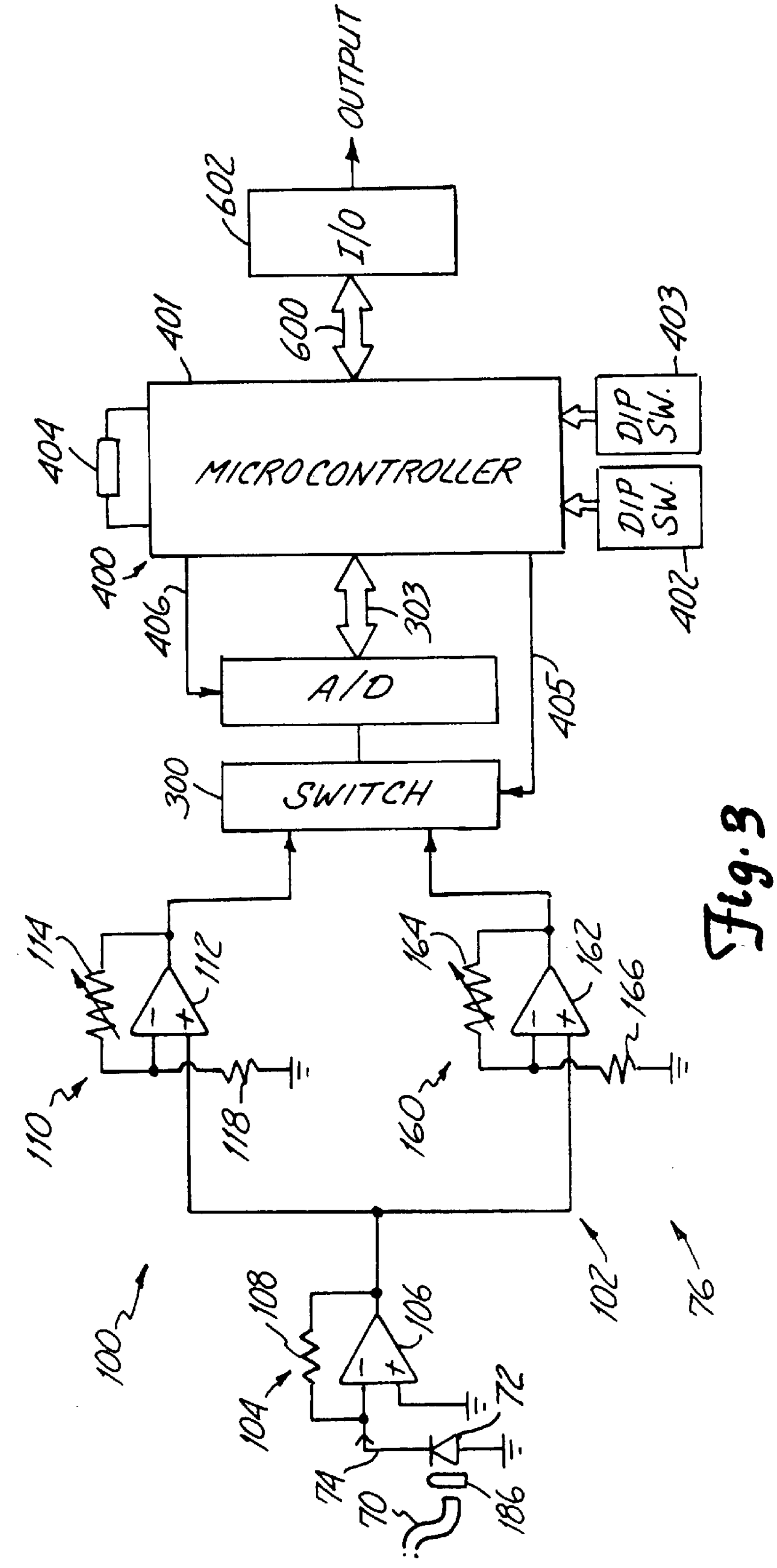
FIG. 3 is a simplified electronic schematic of the optical detection circuitry in accordance with another embodiment of the invention.

FIG. 3 is a simplified schematic diagram of detector circuitry 76 in accordance with another embodiment. Detector circuitry 76 includes the same "front end" as the embodiment of FIG. 2 with the outputs of amplifier circuits 110 and 160 coupled to a analog switch (MUX) 300. Analog switch 300 is controlled by input signal 405 from controller 400. The output of the analog switch 300 is coupled to analog to digital convertor 302. The A/D convertor 302 is controlled by input signal 406 from the controller 400. The output of analog to digital convertor 302 is fed via a bus 303 to the controller 400 for interpretation. Controller 400 includes a micro controller 401, crystal 404, toggle switch 402 and toggle switch 403. Toggle switch 402 is coupled to the micro controller 400 for determination of flame trip level. Switch 403 is coupled to the micro controller 400 for the determination of the flashback trip level. Software in controller 400 provides the determination of the type of signal input, and outputs this information on bus 600 to the engine system controller (not shown) . In the embodiment of FIG. 3, software in micro controller 401 performs the comparison function. A system clock is determined from crystal 404 for micro controller 401. I/O circuitry 602 may be optionally included to provide an output in any desired format such as TTL, or other logic levels such as RS232, 4–20 mA, make/break, bi-level, etc.

Although the invention has been described for use with flashback and flame out detection, any appropriate combustor parameter may be monitored. For example, other types of signal processing may be employed such as filtering, spectral analysis (including fourier analysis), etc., in the time or frequency domains for use in determining an operation condition of the combustor. Techniques other than comparison to a threshold may be used to detect flashback, flame out or other conditions. Such techniques include frequency or signal recognition, pattern recognition, fuzzy logic, neural networks, etc. In general, the use of multiple channels is advantageous because they can be optimized for the particular parameters of interest.

The present invention provides a technique allowing a single entry into the chamber of a combustor which is capable of detecting both flameout and flashback conditions. More than two channels may be provided. The embodiments described herein are shown with a single probe, however, any number of probes may be employed and all placed within the same opening into the combustion chamber. Furthermore, separate channels may be obtained by using more than one probe, more than one optical detector, or other appropriate electrical or optical signal splitting technique. Further, in one embodiment the optical detector may be placed directly within the opening to the combustion chamber thereby eliminating the elongated optical fiber. If the detector is placed near the combustor, it should be able to withstand the high temperature. In this embodiment, the optical detector functions as the probe and probe tip. Furthermore, the various frequencies to which the components of the invention react should be selected based upon the particular combustor and flame characteristics. As used herein, "optical" is intended to refer to radiation in general and is not limited to visible light. Further, the invention can be used in other combustor configurations and is not limited to the specific configuration set forth herein. For example, in some systems the "combustion chamber" and the "mixing area" may both be in the same chamber.

Although the present invention has been described with reference to preferred embodiments, workers skilled in the art will recognize that changes may be made in form and detail without departing from the spirit and scope of the invention.

What is claimed is:

1. A detector for use in a combustion system having a mixing area for fuel and air upstream of a combustion chamber, wherein the combustion system includes means for providing fuel and air to the mixing area and means for igniting the fuel and air in the combustion chamber located downstream of the mixing area, the detector comprising:

a probe having a tip adapted for placement proximate the mixing area and having an optical sensitivity to radiation present in both the mixing area and the combustion chamber and responsively providing an optical output related to such radiation;

a first channel having a first channel signal derived from an optical probe output, the first channel including a first comparator which compares the first channel signal to a first channel threshold and responsively provides a first channel output related to a flameout condition in the combustion system; and a second channel having a second channel signal derived from the optical probe output, the second channel including a second channel comparator which compares the second channel signal to a second channel threshold and responsively provides a second channel output related to a flashback condition in the combustion system.

2. The detector of claim 1 wherein the probe comprises an optical fiber having an end opposite the tip which is positioned proximate to an optical detector for generating the first channel signal and the second channel signal.

3. The detector of claim 1 wherein the probe includes a photo detector providing an electrical photo detector output and the first channel further includes a transimpedance amplifier coupled to the photo detector.

4. The detector of claim 1 wherein the probe includes a photo detector providing an electrical photo detector output and the second channel further includes a transimpedance amplifier coupled to the photo detector.

5. The detector of claim 1 wherein the probe comprises an elongated optical fiber terminated at a distance from a lens proximate the probe tip fitting through an opening in a body of the combustion system.

6. The detector of claim 1 wherein the probe includes an optically filtered or unfiltered photo detector comprising UV enhanced silicon.

7. The detector of claim 1 wherein the first and second channels include differential amplifiers and the first and second thresholds comprise voltage levels.

8. The detector of claim 1 wherein the first channel includes a relay which responsively provides the first channel output.

9. The detector of claim 1 wherein the second channel includes a relay which responsively provides the second channel output.

10. The detector of claim 1 including a microprocessor performing the comparison functions.

11. The detector of claim 10 including an analog to digital converter coupled to the microprocessor responsively providing digital signals to the microprocessor related to the first and second channel signals.

12. The detector of claim 1 wherein the probe tip mounts in a wall of the combustion system and includes an optical fiber extending from the tip to a photodetector which provides the optical output, the detector including a high impedance amplifier coupled to the optical output responsively providing the first and second channel signals.

13. The detector of claim 12 wherein the first and second channels each include an amplifier and a resistor network to generate the thresholds.

* * * * *